(12) United States Patent
Kapre et al.

(10) Patent No.: US 8,097,437 B2
(45) Date of Patent: Jan. 17, 2012

(54) HIGHLY PURE POLYSIALIC ACID AND PROCESS FOR PREPARATION THEREOF

(75) Inventors: Subhash V. Kapre, Pune (IN); Umesh Shaligram, Pune (IN)

(73) Assignee: Serum Institute of India Ltd., Pune (IN)

( * ) Notice: Subject to any disclaimer, the term of this patent is extended or adjusted under 35 U.S.C. 154(b) by 254 days.

(21) Appl. No.: 12/373,571

(22) PCT Filed: Jul. 13, 2007

(86) PCT No.: PCT/IN2007/000291
§ 371 (c)(1),
(2), (4) Date: Jan. 13, 2009

(87) PCT Pub. No.: WO2008/035373
PCT Pub. Date: Mar. 27, 2008

(65) Prior Publication Data
US 2010/0086974 A1    Apr. 8, 2010

(51) Int. Cl.
C12P 9/28 (2006.01)
C07H 1/00 (2006.01)
A61K 31/7008 (2006.01)
A61K 31/726 (2006.01)
C12N 1/20 (2006.01)

(52) U.S. Cl. ........ 435/84; 536/22.1; 536/123.1; 514/42; 435/252.8

(58) Field of Classification Search ............... 435/84, 435/252.8; 536/22.1, 123.1; 514/42
See application file for complete search history.

(56) References Cited

OTHER PUBLICATIONS

Weisgerber et al., "Biosynthesis of the polysialic acid capsule in *Escherichia coli* K1," J Biol Chem 265(3):1578-1587, 1990.*
Hallenbeck et al., "Purification and properties of a bacteriophage-induced endo-N-acetylneuraminidase specific for poly-$\alpha$-2,8-sialosyl carbohydrate units," J Biol Chem 262(8):3553-3561, 1987.*
Pelkonen et al., "Polyacrylamide gel electrophoresis of the capsular polysaccharides of *Escherichia coli* K1 and other bacteria," J Bacteriol 170(6):2646-2653, 1988.*
Mushtaq et al., "Prevention and cure of system *Escherichia coli* K1 infection by modification of the bacterial phenotype," Antimicrobial Agents and Chemotherapy 48(5):1503-1508, 2004.*
Ørskov et al., "Form variation in *Escherichia coli* K1 determined by O-acetylation of the capsular polysaccharide," J Exp Med 149:669-685, 1979.*
International Search Report mailed Dec. 9, 2008 from corresponding International Application No. PCT/IN2007/000291.
Puente-Polledo, L. et al., Biochemical Conditions for the Production o Polysialic Acid by *Pasteurella haemolytica* A2, Glycoconjugate Journal 15.855-861 (1998), [p. 856, Methods.

* cited by examiner

*Primary Examiner* — Rosanne Kosson
(74) *Attorney, Agent, or Firm* — Wolf, Greenfield & Sacks, P.C.

(57) ABSTRACT

The instant invention provides highly pure Polysialic acid and process for preparation thereof.

12 Claims, No Drawings

HIGHLY PURE POLYSIALIC ACID AND PROCESS FOR PREPARATION THEREOF

FIELD OF THE INVENTION

The present invention is related to highly pure Polysialic acid and a commercial scale process for the production thereof with high yields.

BACKGROUND OF THE INVENTION

Polysialic acid (PSA), known as colominic acid, is a polymer of sialic acid whose degree of polymerization (DP) is 8 to 200 residues (Barker, S. A., Jones, R. G., Somers, P. J.; Improvements in the production and isolation of Colominic acid; Carbohydrate research; 369-376, 3, (1967). The most common structure of PSA is the Neu5Ac polymer whose inter-residual linkage is $\alpha 2 \rightarrow 8$. The conformation of PSA is a helical structure in which N-acetyl substitution of the C5 position faces the outer space of the helix. PSA occur as important components of glycoprotein, gangliosides and oligosaccharides and are usually found in their terminal positions.

PSA is a natural constituent of the human body and also of certain bacteria. PSA evolved over a millions of years by bacteria to foil the body's defense system. Being chemically identical to PSA in the human body, bacterial PSA, by virtue of this structural mimicry, is completely non-immunogenic, even when coupled to proteins. Unlike other polymers (e.g. PEG) PSA is biodegradable. This is particularly important where a polymer is used for therapeutics given chronically or in large dosages.

Polysialic acid has extensive applications in the pharmacology. Exclusive presence of therapeutics in a stable form in the body, is often needed for optimal use. However, many therapeutics, for instance cytokines, hormones, enzymes and other proteins such as antibody fragments, as well as conventional drugs, are inactivated or removed from the body rapidly and before effective concentrations in the blood or target tissues can be attained. In this respect, polysialic acid can be used to improve the pharmacokinetics and pharmacodynamics of therapeutic molecules. PSA as a delivery vehicle for drug molecules particularly of small sizes can circumvent many of the problems encountered in the direct use of such drug molecules. It can preserve functionality on conjugation, improve stability in vivo, prolong presence in the blood circulation, prolong pharmacological action, reduce immunogenicity and antigenicity. PSA has certain advantages that may be essential for the next generation of therapeutics. Particularly high molecular weight PSA will be desirable to act as vehicle for drug molecules.

In order to meet the increasing demand for commercial PSA, economical large-scale production of high-grade purity PSA is necessary. Only a few natural sources such as swallow's nests, whey from cheese production, chalaze, egg membranes and the products of microbial fermentation processes, have been explored for practical industrial scale preparation of PSA.

JP 1-144989A discloses the production of colominic acid by E. coli M12 but the yields were very low ~40 mg/L.

JP 05084091 discloses the use of L-malic acid as a source of C and the ammonium sulfate as a source of N, in order to increase the production of the colominic acid. The patent does not disclose the final yields, process of isolation and purity of the product.

JP 06245786A2 discloses fermentation of liquid raw material using E. coli in order to yield the colominic acid and further purified by affinity column chromatography by using lectin as a stationary phase. The drawback associated with such method is that it involves multi-step lengthy process of immobilizing lectin over gel, for use as a stationary phase. Also, during further purification process it requires additional elution steps with sodium acetate buffer to clear N-acetyl-D-glucosamine used as an inhibition agent for wheat germ lectin and glycoprotein.

Mushtaq et. al. (2004 Antimicrob Agents Chemother. 48(5) 1503-1508) disclosed E. coli K1 LP 1674 producing PSA wherein the E. coli produces the PSA in body of the patient to cause infection.

Weisgerber et. al. (1990 JBC 265/3 1578-1587) and Pelkonen et. al. (1988 J. Bacteriol. 170 (6) 2646-2653) disclosed media containing casamino acid for the production of PSA. The article discussed biosynthesis of PSA capsule in E. coli K1. All the work done here is on laboratory/characterization scale.

Zhan et. al. (2002 Biochem. Engg J. 11(2) 201-204) disclosed production of PSA by batch and fed-batch fermentation with controlled pH 6.4 during stationary phase. The drawback of this method is that the PSA produced by this method is of lower molecular weight.

Ringenberg et. al. (2001 Glycobiology 11(7) 533-539) disclosed isolation of PSA using Ultrafiltration and analysis using HPLC on CarboPac PA 1 column. The volumes handles here were in mu. L level.

Lin et. al. (1999 Glycobiology 9(8) 807-814) and Inoue et. al. (2001 Glycobiology 11(9) 759-769) disclosed preparation of samples of oligo/polysialic acid using Prep DEAE Sephadex A 25 wherein pure samples of colominic acid or Ne5Ac were obtained from various sources which were then separated using preparative ion exchange chromatography.

Ohe et. al. (2002 Glycobiology 12(1) 47-63), Miyata et. al. (2004 Glycobiology 14(9) 827-840) and Hallenbeck et. al. (1987 Anal Biochem. Feb 15; 161(1):181-6) disclosed HPLC analysis of PSA samples using anion exchange column.

JP08-070882 by NGK Insulators Ltd disclosed process for purification of sialic acid after hydrolysis of PSA, wherein the PSA was isolated using ultrafiltration and ion exchange chromatography. The patent does not disclose yields of PSA and the purity of the same. The scale of the operation is also not clear.

Adam et. al. 1995 Anal Biochem. Mar 1; 225(2):321-7 disclosed that ultracentrifugation, Detoxi-Gel, and ion-exchange chromatography did not remove endotoxin, except gel filtration chromatography performed at 60 degrees C. in sodium deoxycholate buffer.

For removal of DNA, protein, lipid and other impurities, purification processes like phenol extraction, detergents and solvent precipitation etc. are used. The disadvantages of phenol is that it is corrosive and unsafe to handle during scale up; The extraction and phase separation procedure with solvents are tedious using scaled up equipments with GMP, handling large quantity of phenol at 65° C. is inconvenient in extraction procedure.

Other purification method involving precipitation has the drawbacks of inconvenient and tedious operation at commercial scale, batch-to-batch inconsistency, low recovery and low degree of purification.

Trichloroacetic acid (TCA) is commonly used to precipitate the proteins; however TCA can hydrolyze the products like polysialic acid during the purification steps.

Use of CTAB detergent for precipitation [(Bolanos, R., Dewitt, C. W., Isolation and characterization of the K1 (L) antigen of Escherichia coli, J. Bacteriology. 1987-1996, 19, 3, (1966)] has drawback of poor yields. It is also difficult to remove detergents which interferes with other purification method hence require an additional step of removal. Also an additional step in the form of ethanol precipitation further lowers the recovery due to simultaneous precipitation of product like PSA and protein Additional step of re-dissolving the precipitate and fractional precipitation steps have to be added.

Phenyl boronate is used, to remove carbohydrate impurities in the chromatography process, which is known to have general affinity for carbohydrates (Hage, D. S., Affinity chromatography: A review of clinical applications, Clin. Chem. 593-615, 45:5, (1999). The column requires higher quantities of resin during scale up. The major difficulty in using Phenyl boronate is that it retains the protein impurities in a mixture without separation and thus affecting the purity.

It is reported in literature that hydroxylapetitie (HA) is used for the separation of DNA from samples as it shows high binding affinity for DNA molecules. The disadvantage proteins also remain along with DNA beyond the permissible limits.

Few possible processing steps would result in having the most efficient way of reaching high process efficiency and low costs in the overall production process. Most currently used purification processes still involve multiple steps of processing which add to the costs, loss of product and offer opportunities for contamination.

The prior art disclosed above suffers from one or more drawbacks selected from:
1. Analytical or preparative scale methods
2. Lower yields
3. Crude or impure product Therefore, a need exists for a process for production and purification of PSA that overcomes the problems seen in the prior art and provides higher yields of Polysialic acid with high-grade purity.

SUMMARY OF THE INVENTION

The present invention relates to a highly pure polysialic acid and a commercial scale process for the production of the same.

In particular, the invention relates to highly pure Polysialic acid, polysialic acid of high molecular weight and a high yielding process comprising fermentation and purification.

The process for the production of Polysialic acid comprises:
 a. Fermentation to produce Polysialic acid in high yields;
 b. Isolation and purification of Polysialic acid with high purity.

The polysialic acid obtained by the instant invention has higher molecular weight. The molecular weight of the polysialic acid is preferably between 70000 to 100000 Da.

DETAILED DESCRIPTION

The present invention relates to a highly pure polysialic acid and a commercial scale process for the production thereof.

In general, the first embodiment of the instant invention is highly pure Polysialic acid.

The second embodiment of the instant invention is high molecular weight Polysialic acid.

The third embodiment of the instant invention is a process for the production of highly pure Polysialic acid with high yields.

Specifically, the first embodiment of the instant invention is highly pure Polysialic acid with purity more than 95%, preferably purity more than 99.0%, more preferably purity more than 99.9%. The total impurities found in the PSA of the instant invention are less than 5%, preferably less than 1%, more preferably less than 0.1%. The PSA of the instant invention shows endotoxin content less than 100 EU/microgram, preferably less than 10 EU/milligram.

Specifically, the second embodiment of the instant invention is that the PSA of the instant invention has high molecular weight, preferably more than 70000 Da, more preferably the molecular weight of the PSA is between 70000 and 100000 Da.

Specifically, the third embodiment of the instant invention is the process affording the PSA of high purity with high yields.

The process of the instant invention comprises fermentation and purification steps affording high yields of PSA with very less amount of impurities like protein, nucleic acid or endotoxins.

The fermentation step of the instant invention can be carried out employing a suitable microorganism capable of producing PSA. The microorganism may be of wild type or genetically modified employing conventional or directed/targeted techniques. The most preferred organism is *E. coli* capable of producing PSA.

The fermentation medium can contain carbon source, nitrogen source and macro and micronutrients known to a person skilled in the art or prior art. The preferred ingredients are selected from glycerol, sugars preferably, glucose and salt.

It is surprisingly and unexpectedly found that the *E. coli* when supplemented with compounds selected from casamino acid, yeast extract, sorbitol, succinic acid and copper sulphate resulted in higher yields of PSA as compared to medium known in the prior art.

It was surprisingly and unexpectedly found that with controlled pH, temperature and dissolved oxygen of fermentation when supplemented with the specified media ingredients like copper sulphate and casamino acid, the production of high molecular weight PSA could be carried out in batch, fed-batch or continuous mode without affecting the productivity of PSA. In turn, the productivity of PSA is enhanced dramatically when the fermentation is carried out under controlled conditions and supplemented with the specified media ingredients.

The fermentation step of the instant invention can be carried out under controlled conditions of pH, temperature and dissolved oxygen in batch, fed batch or continuous mode. In a particularly preferred embodiment the process of the present invention is carried out in fed batch mode for a longer duration e.g. more than 5 days 150 hr, without affecting the productivity of PSA.

The preferred pH in the fermentation step is 7 (±0.5), the preferred DO in the fermentation step is 40% (±5) and the preferred temperature of the fermentation is 37° C. (±5).

In the fed-batch, fermentation mode the fermentation may be carried out for 100 TO 150 hrs.

After sufficient production of PSA in the fermentation broth, the broth can be subjected to a step of cell mass isolation. The step may be selected from centrifugation or cross-flow filtration. The supernatant obtained contains the PSA and therefore the cellular mass can be recirculated to fermenter for continuous fermentation, if desired. Generally at this step, the protein content is around 7% and the nucleic acid content is around 2% of PSA w/w. The supernatant containing the product may be subjected to a process of concentration. The concentration of the supernatant may be carried out by ultrafiltration.

The mass containing the product can be subjected to purification employing chromatography. The product may be purified employing adsorbents selected from hydrophobic, ionic or affinity. The adsorption/desorption may be carried out in such a way that the product may not be adsorbed on the adsorbent while the impurities are adsorbed.

The preferred hydrophobic adsorbent can be selected from matrix linked with Octyl, phenyl or suitable hydrophobic group of the matrix or attached to the matrix.

The ionic adsorbent can be selected from matrix loaded with DEAE, Q or suitable anion exchanger.

Cation exchanger (e.g. carboxy methyl, SP or PS-DVBSO3-) can also be employed in the purification PSA, if required.

The affinity adsorbent can be selected to adsorb the impurities. The preferred adsorbent is selected in such a way that it adsorbs endotoxin and the product is not adsorbed on to the adsorbent. The most preferred adsorbent is detoxi gel.

The product can be subjected to sterile filtration using 0.2 micron membrane or suitable method.

It has been unexpectedly found that the final product afforded after the purification exhibits very high purity levels. The total impurities that found were less than 5%. The protein content that found was less than 1% w/w protein/peptides. The nucleic acid content found was less than 1% and endotoxin content found was $\leq$100 EU/mcg of PSA.

The purer product obtained by the instant invention contained less than 1% total impurities, less than 0.5% protein/peptides, less than 0.5% nucleic acids and less than 10 EU/mg endotoxin.

The PSA can be more than 99.5% pure with more than 50% yields.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

EXAMPLES

Example 1

Batch Fermentation 1 mL MWCB was inoculated in 200 ml shake flask containing media comprising Yeast Extract (12 g/L), Pancreatic digest of casein (24 g/L), Di-potassium Hydrogen phosphate (9.4 g/L), Potassium di-Hydrogen phosphate (2.2 g/L) and incubated for 5 hrs at 37° C. and 150 rpm. This shake flask was used to inoculate in fermenter containing 10 L media comprising Di-potassium Hydrogen phosphate (10 g/L), Yeast Extract (0.5 g/L), Magnesium sulphate (0.5 g/L), Copper Sulphate (0.002 g/L), Casamino Acid (8 g/L), Sorbitol (10 g/L) was prepared and sterilized in 30 L fermenter. The fermentation was carried out at Temperature at 37° C., RPM: 300, Airflow rate: 1 VVM, pH: 7, Dissolved oxygen (DO): 40% (cascading with agitation, overhead pressure and substrate feed), $CuSO_4$ concentration in the media was maintained around the 0.002 g/L. After total 15 hrs of fermentation When DO reached to 100%, the batch was harvested. The PSA yield achieved was 1.5 g/L.

Example 2

Fed Batch Fermentation 1 mL MWCB is inoculated in 200 ml shake flask containing media comprising Yeast Extract (12 g/L), Pancreatic digest of casein (24 g/L), Di-potassium Hydrogen phosphate (9.4 g/L), Potassium di-Hydrogen phosphate (2.2 g/L) and incubated for 4 to 6 hrs at 37° C. and 150 rpm. This shake flask was used to inoculate in fermenter containing 10 L media comprising Di-potassium Hydrogen phosphate (10 g/L), Yeast Extract (0.5 g/L), Magnesium sulphate (0.5 g/L), Copper Sulphate (0.002 g/L), Casamino Acid (8 g/L), Sorbitol (10 g/L) was prepared and sterilized in 30 L fermenter. The fermentation was carried out at Temperature at 37° C., RPM: 300, Airflow rate: 1 VVM, pH:7, Dissolved oxygen (DO): 40% (cascading with agitation, overhead pressure and substrate feed), throughout the batch DO is maintained around 40%. $CuSO_4$ concentration in the media was maintained around the 0.002 g/L. After total 48 hrs of fermentation, concentrated substrate automated feed was started based on the DO levels. The fermentation was continued for 150 hours with repeated broth removal (10 L) each time the broth volume reached 25 L and PSA concentration reached 3 g/L.

Example 3

Purification of PSA

The broth (20 L) containing PSA was subjected to cross flow microfiltration using 0.45 micron membranes in closed system. The permemeate/supernatant (18 L) was subjected to ultrafiltration with 10 KD ultrafiltration. The ultrafiltered broth (2 L) was loaded on DEAE resin and eluted using 0.3M NaCl in 8 mM sodium phosphate buffer pH 7.2. The DEAE eluate (22 L) was loaded on Q-sepharose and eluted at 0.5M NaCl in 8 mM sodium phosphate buffer pH 7.2. The elute (20 L) was subjected to concentration and dialfiltration and then subjected to sterile filtration employing 0.2 micron membranes. The final product contained 0.4% w/w protein, 10 ng/mg nucleic acid and 90 EU/mcg endotoxin. The yield of PSA was 60%.

Example 4

Purification of PSA

The broth (20 L) containing PSA was subjected to cross flow microfiltration using 0.45 micron membranes in closed system. At this stage, protein concentration was 7% and the nucleic acid content was 2% of PSA concentration. The permeate/supernatant (18 L) was subjected to ultrafiltration with 10 KD ultrafiltration cassette. The mass (2 L) containing PSA was loaded on HIC (Octyl Sepharose) using 8 mM sodium phosphate buffer and 1M sodium chloride. The flow through was collected that contained PSA. The resulting flow through (3 L) was diafiltered against 8 mM sodium phosphate buffer pH 7.2. The filtrate (2 L) loaded on the IEC (Q-Sepharose). PSA was eluted using 8 mM sodium phosphate buffer pH 7.2 and sodium chloride.

The elute (20 L) from IEC was diluted to 5 fold and loaded on Detoxi-gel and the flow through was collected. The flow through (22 L) was concentrated (to 2.5 L) and subjected to sterile filtration employing 0.2 micron membranes. The final product contained 0.35% w/w protein, 8 ng/mg nucleic acid and 10 EU/mg endotoxin.

The yield of PSA was 55%.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

We claim:

1. A process for the production of polysialic acid having purity of greater than 99.0% and an average molecular weight of 70 KDa to 100 KDa, comprising the steps of:
    (a) preparing a nutrient medium containing sorbitol in an amount of 8 g/L to 12 g/L, yeast extract in an amount of 0.4 g/L to 0.6 g/L, casamino acids in an amount of 8 g/L, potassium hydrogen phosphate in an amount of 8 g/L to 12 g/L, copper sulphate in an amount of 0.001 g/L to 0.003 g/L, and magnesium sulphate in an amount of 0.4 g/L to 0.6 g/L;
    (b) inoculating a fermentor comprising the nutrient medium with a polysialic acid producing bacterium;
    (c) incubating the inoculated medium at a temperature of 30 to 40° C., a pH of 6.5 to 7.5, a dissolved oxygen percentage of 35 to 45% and an agitation of 100 to about 150 rpm;
    (d) harvesting the polysialic acid produced in step (c); and
    (e) concentrating or purifying the polysialic acid obtained in step (d).

2. The process for the production of polysialic acid according to claim 1, wherein said copper sulphate is in an amount of 0.002 g/L.

3. The process for the production of polysialic acid according to claim 1, wherein said polysialic acid producing bacterium belongs to the *Escherichia coli* (*E. coli*) sero group 07:K1 and does not show O-acetylation of polysialic acid.

4. The process for the production of polysialic acid according to claim 1, wherein said polysialic acid producing bacterium is *E. coli* LP 1674.

5. The process for the production of polysialic acid according to claim 1, wherein said inoculation is by an inoculum having an optical density of 2 to 3.

6. The process for the production of polysialic acid according to claim 1, wherein said incubation is performed at a temperature of 37° C., a pH of 7, a dissolved oxygen percentage of 40%, and an agitation of about 150 rpm for 4 to 6 hours.

7. The process for the production of polysialic acid according to claim 1, wherein said harvesting is performed by cross flow microfiltration of the fermentation broth with 0.45 micron cassettes in a closed system or centrifugation of the fermentation broth at 4000 rpm.

8. The process for the production of polysialic acid according to claim 1, wherein said concentration of polysialic acid is performed by ultrafiltration using 10 KDa centrifugal filters and subjecting the retentate to buffer exchange at pH 6.5 to 7.5 with optional ultrafiltration using a 0.2 micron filter.

9. The process for the production of polysialic acid according to claim 1, wherein said purification of polysialic acid is performed by separating the impurities by anion exchange chromatography followed by washing the separated polysialic acid with 6M Urea at pH 4.5, and optional ultrafiltration using a 0.2 micron filter.

10. The process for the production of polysialic acid according to claim 1, wherein said polysialic acid contains less than 1% total impurities, the impurities comprising proteins, nucleic acids and endotoxins.

11. The process for the production of polysialic acid according to claim 1, wherein the endotoxin content of the polysialic acid is less than 10 EU/mg.

12. The process according to claim 1, wherein the process is fed-batch.

* * * * *